United States Patent [19]

Bemis

[11] 4,319,972
[45] Mar. 16, 1982

[54] AC ETCHING OF ALUMINUM CAPACITOR FOIL

[75] Inventor: Richard A. Bemis, North Adams, Mass.

[73] Assignee: Sprague Electric Company, North Adams, Mass.

[21] Appl. No.: 215,595

[22] Filed: Dec. 12, 1980

[51] Int. Cl.³ ............................ C25F 3/04; C25F 3/14
[52] U.S. Cl. ............................ 204/129.43; 204/129.95
[58] Field of Search ............ 204/129.4, 129.43, 129.95

[56] References Cited

U.S. PATENT DOCUMENTS

| 1,971,761 | 8/1934 | Travers | 204/3 |
| 2,166,990 | 7/1939 | Gray | 156/651 |
| 3,728,237 | 4/1973 | Heijenbrok et al. | 204/129.75 |
| 4,198,278 | 4/1980 | Mehada et al. | 204/129.75 |
| 4,276,129 | 6/1981 | Kanzaki | 204/58 |

FOREIGN PATENT DOCUMENTS

| 49-40537 | 11/1974 | Japan . |
| 55-11364 | 1/1980 | Japan . |
| 879768 | 10/1961 | United Kingdom | 204/129.35 |

Primary Examiner—T. Tufariello
Attorney, Agent, or Firm—Connolly and Hutz

[57] ABSTRACT

Aluminum electrolytic capacitor foil is etched in a bath containing 0.75 to 1.8 M hydrochloric acid, 0.2 to 0.5 M aluminum chloride, and 0.05 to 0.4 M oxalic acid, while subjected to the action of alternating current of 16 to 36 Hz at 30 to 45° C. in a single stage process.

3 Claims, 1 Drawing Figure

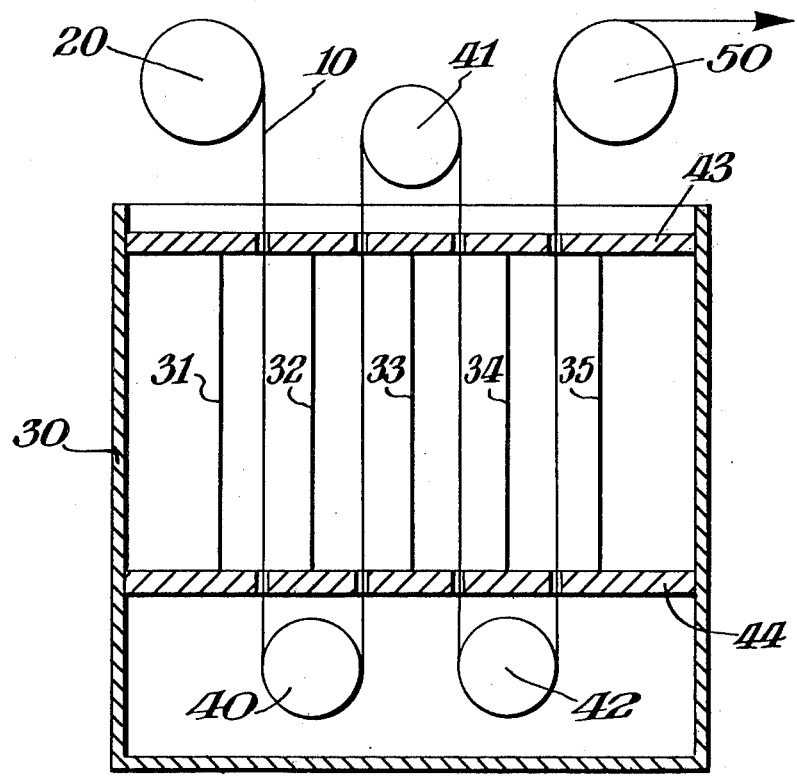

AC ETCHING OF ALUMINUM CAPACITOR FOIL

BACKGROUND OF THE INVENTION

This invention relates to the single stage AC etching of aluminum capacitor foil to produce a foil with a metallic core, and hence good mechanical properties, as well as improved capacitance. The electrolyte system contains hydrochloric and oxalic acids and aluminum ions. The etching is carried out at 30° to 45° C. and 16.4 to 36 Hz frequency.

AC etching has been used to produce aluminum articles such as lithographic plates and capacitor foil. It also has been used to electropolish aluminum articles prior to metal plating.

The prior art has discussed the difficulties in obtaining an even or uniform etch structure and has overcome these difficulties in a variety of ways, e.g., interrupting the etch process to apply protective coatings, carrying out the etch process in stages and using additives in the electrolyte bath to control pit size or to increase mechanical strength of the foil.

Another problem has been to prevent the precipitation of aluminum hydroxide, formed during etching, on or into the etched surfaces.

The resolution of these problems has led to prior art processes in which the etch conditions are carefully controlled to provide the desired increase in surface area and, particularly for capacitor foil, with little change in mechanical strength. Such a process is described by M. Arora and J. J. Randall, Jr., in copending application Ser. No. 187,241, filed Sept. 15, 1980 now U.S. Pat. No. 4,279,714, that utilizes a phosphate in the hydrochloric etch bath. Another such process is described by M. Arora, E. J. Paquette and A. B. McPherson in copending application Ser. No. 210,940, filed Nov. 28, 1980, that utilizes both phosphoric and nitric acids in the hydrochloric acid etch bath. Another process is described by M. Arora in copending application Ser. No. 188,637, filed Sept. 19, 1980, that utilizes an intermittent etch scheme.

Still other processes utilize both DC and AC etching to form tunnels in one stage and then broaden them in the next stage without impairing the mechanical strength of the foil.

SUMMARY OF THE INVENTION

This invention features a single-stage AC etch process for aluminum electrolytic capacitor foil in which the desired number of etch sites of both suitable size and depth are obtained by the use of a hydrochloric acid etch bath containing aluminum chloride and oxalic acid at 30° to 45° C. and 16 to 36 Hz frequency. The resulting process is more economical and easier to control than prior art processes utilizing two stages and associated equipment.

As is known, the presence of aluminum ions in the bath catalyzes the etch reaction, and initially 0.2 M concentration is required. Higher concentrations of aluminum ion are preferred, as electrolyte recycle and recovery rate are a function of aluminum ion concentration and the amount of auxiliary recycle equipment is less at higher concentrations. However, at about 0.5 M aluminum ion, the character of the etching changes to a uniform corrosion rather than a preferential tunnel etching. Therefore, a concentration below 0.5 M is preferred.

The hydrochloric acid provides both the chloride ion for etching plus the acidic conditions needed to keep aluminum hydroxide from precipitating, particularly onto the foil. The hydrochloric acid concentration is maintained at 0.75 to 1.8 M for these reasons.

The oxalic acid appears to control the number of etch sites by inhibiting or retarding the etching of sites already started leading to attack at new sites. As a result, the etched foil has a strong central core that is not pervaded by etch tunnels and a surface with a great number of etched sites of sufficient size and depth to provide the desired capacitance without mechanically weakening the foil.

The temperature at which the above etchant solution gives these desired results is 30° to 45° C. Below about 30° C., there are fewer and larger etch pores; above about 45° C., there are more pores but they are narrower and resulting capacitance is lower than between these temperatures.

The frequency of the alternating current is maintained at 16 to 36 Hz with the above etchant as this frequency range was found to lead to optimum capacitance. The voltage, a function of current density and etch cell design, is ±7 V. With a different cell design, the voltage will differ also.

In order to improve process control, it is desirable to work with the simplest electrolyte possible while achieving the desired results. Nitric acid, a component in the Arora, Paquette, and McPherson process, noted above, presents both corrosion and waste treatment problems. By replacing two ingredients of that electrolyte, namely both nitric and phosphoric acids, with oxalic acid while still being able to work at moderate temperatures permits simpler process control and waste treatment problems.

BRIEF DESCRIPTION OF THE DRAWING

The sole FIGURE shows foil being etched by the process of the present invention.

DESCRIPTION OF THE PREFERRED EMBODIMENTS

Aluminum foil 10 is passed over roll 20 into etching tank 30 between insulated electrodes 31 and 32, under roll 40 and between electrodes 32 and 33, over roll 41 and between electrodes 33 and 34, under roll 42 and between electrodes 34 and 35, and out of tank 30 and over roll 50. The electrodes are carried by insulated frames 43 and 44 that have openings for passage of foil 10. More electrodes and rolls may be used than shown. In fact, it is more efficient to use more electrodes, but enough have been shown to illustrate the invention.

Because the electrodes 31, 32, 33, 34 and 35 are mounted in insulated frames 43 and 44, the alternating current passed through them is forced to pass through the foil and not through the main body of etchant solution. In this way, the foil is electrochemically etched during the time the foil passes between a pair of electrodes and not electrochemically etched when outside the frame, e.g., between frame 44 and roll 40.

The etched foil obtained by the method of the present invention retains a solid metallic core that gives good mechanical properties and low-temperature capacitance retention. There is an interrelationship among etchant composition and concentration, temperature, AC frequency, and current density, with the last being the least crucial, that gives the desired results, i.e. good capacitance and mechanical properties, not just etchant composition and concentration alone.

Capacitance and low-temperature properties were found to be comparable to that obtained with the etchant containing both phosphoric and nitric acids, refered to earlier, and also to that of a high-quality competitive product.

In the examples below, soft foil of 99.99% purity was used. Hard foil can be etched by this process, as can foil of different purity, but satisfactory capacitance is obtained without resorting to hard foil and the processing problem associated therewith.

The etch scheme used is that described by M. Arora in the above-identified copending application Ser. No. 188,637 filed Sept. 19, 1980 which is incorporated by reference herein. Since the foil is etched intermittently, the total charge passed to the foil is a more meaningful unit than etching time.

EXAMPLE 1

Pilot plant runs were made using the hydrochloric acid-oxalic acid electrolyte. The runs were made using AC current at 26 Hz frequency, total charge passed of 652 coulombs/in$^2$ of foil surface, and a current density of 2.9 amperes/in$^2$.

TABLE 1

| Run | HCl | AlCl$_3$ | Oxalic Acid | Temp. | Wt. loss % | Cap/unit area, $\mu$F/in$^2$ 10V | 30V |
|---|---|---|---|---|---|---|---|
| 1 | 1.58M | 0.3M | 0.3M | 36° C. | 31.5 | 255 | 85.2 |
| 2 | 1.60M | 0.27M | 0.3M | 37° C. | 35.0 | 243 | 82.1 |

EXAMPLE 2

Several experiments with the oxalic acid concentrations varying from 0.05 M to 0.35 M established the following preferred conditions in the pilot unit.

TABLE 2

| HCl | AlCl$_3$ | Oxalic Acid | Wt. loss % | Thickness | 30V Cap./in$^2$ |
|---|---|---|---|---|---|
| 1.25M | 0.33M | 0.30M | 31.5 | 2.9 mils | 93.8 $\mu$F/in$^2$ |

The temperature was 37° C. and frequency was 26 Hz. Thickness is foil thickness after etching 3 mil soft foil. Capacitance and low-temperature properties were found to be comparable to that obtained with the etchant containing both phosphoric and nitric acids referred to earlier, and also to that of a high-quality competitive product.

A series of runs were made using the hydrochloric acid-oxalic acid etchant of this invention. These runs established that the following ranges of conditions are desirable: hydrochloric acid, 0.75 to 1.8 M; oxalic acid, 0.05 to 0.4 M; aluminum chloride, 0.2 to 0.5 M; temperature 30° to 45° C.; and frequency of the AC current, 16 to 36 Hz. The runs also established that the water used to make up the etchant bath be low in sulfate ion if not sulfate-free. When water containing sulfate ion was inadvertently used, etched foil quality was very poor.

It is desirable to work with as high an aluminum chloride concentration as possible to cut down on recycle rate and equipment. About 0.2 M is needed initially to catalyze the reaction. Since aluminum ion is produced in the reaction, it is desirable to keep it below 0.5 M, i.e., 0.33 M, to allow a safety factor in case of upset so that etching instead of uniform corrosion takes place.

The oxalic acid concentration is maintained between 0.05 and 0.4 M as concentrations below 0.05 M are hard to control and 0.4 M appears to be the upper range for improving capacitance. Practically, enough oxalic acid is used to be above the threshold value so that small variations in concentration do not drastically change results.

Since the best capacitance is obtained at 0.3 M oxalic acid, 1.25 M hydrochloric acid and 0.33 M aluminum chloride at 37° C. and 26 Hz, these are the preferred conditions.

What is claimed is:

1. A process for etching aluminum electrolytic capacitor foil comprising subjecting the foil intermittently to the action of AC current at 16 to 36 Hz frequency in a single stage in an aqueous bath consisting essentially of 0.75 to 1.8 M hydrochloric acid, 0.2 to 0.5 M aluminum chloride, and 0.05 to 0.4 M oxalic acid and at a temperature of 30° to 45° C. by passing said foil between a pair of electrodes in an insulated frame during which etching takes place and then out of the field of said electrodes during which no electrochemical etching takes place.

2. A process according to claim 1 wherein said aqueous bath is composed of substantially sulfate-free water.

3. A process according to claim 1 wherein said etch bath contains 1.25 M hydrochloric acid, 0.3 M aluminum chloride, and 0.3 M oxalic acid, said frequency is 26 Hz, and said temperature is 37° C.

* * * * *